United States Patent
Alexander et al.

(10) Patent No.: US 9,507,602 B2
(45) Date of Patent: *Nov. 29, 2016

(54) SHARING PROGRAM INTERRUPT LOGIC IN A MULTITHREADED PROCESSOR

(71) Applicant: International Business Machines Corporation, Armonk, NY (US)

(72) Inventors: Khary J. Alexander, Poughkeepsie, NY (US); Michael Billeci, Tivoli, NY (US); Fadi Y. Busaba, Poughkeepsie, NY (US); Mark S. Farrell, Pleasant Valley, NY (US); Christian Jacobi, Poughkeepsie, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,122

(22) Filed: Mar. 28, 2016

(65) Prior Publication Data

US 2016/0196144 A1 Jul. 7, 2016

Related U.S. Application Data

(63) Continuation of application No. 14/570,690, filed on Dec. 15, 2014.

(51) Int. Cl.
*G06F 9/50* (2006.01)
*G06F 9/38* (2006.01)

(52) U.S. Cl.
CPC .......... *G06F 9/3861* (2013.01); *G06F 9/5005* (2013.01)

(58) Field of Classification Search
CPC ........................... G06F 9/3861; G06F 9/5005
See application file for complete search history.

(56) References Cited

U.S. PATENT DOCUMENTS

| 3,603,934 | A * | 9/1971 | Heath, Jr. ............... | G06F 11/20 708/530 |
| 2004/0215937 | A1 | 10/2004 | Burky et al. | |
| 2008/0091867 | A1 | 4/2008 | Plondke et al. | |
| 2009/0144519 | A1 * | 6/2009 | Codrescu ................ | G06F 9/526 711/207 |
| 2014/0281679 | A1 * | 9/2014 | Giroux .................. | G06F 11/141 714/6.1 |

OTHER PUBLICATIONS

Microsoft, "Patterns & Practices—Chapter 6: Transient Fault Handling", pp. 1-11, Jan. 11, 2012.*

* cited by examiner

*Primary Examiner* — David J Huisman
(74) *Attorney, Agent, or Firm* — Cantor Colburn LLP; Margaret McNamara

(57) ABSTRACT

In one embodiment, a computer-implemented method includes requesting, by a first processor thread of a computer processor, access to exception tracking logic. The exception tracking logic is accessible by a plurality of processor threads. The first processor thread receives access to the exception tracking logic. The first processor thread executes a process in slow mode. Based on detecting an exception in slow mode, the first processor thread stores, in the exception tracking logic, exception information about the exception. The exception information is copied from the exception tracking logic to a set of external registers outside the exception tracking logic. The exception tracking logic is released to allow access to the exception tracking logic by other processor threads of the plurality of processor threads.

1 Claim, 3 Drawing Sheets

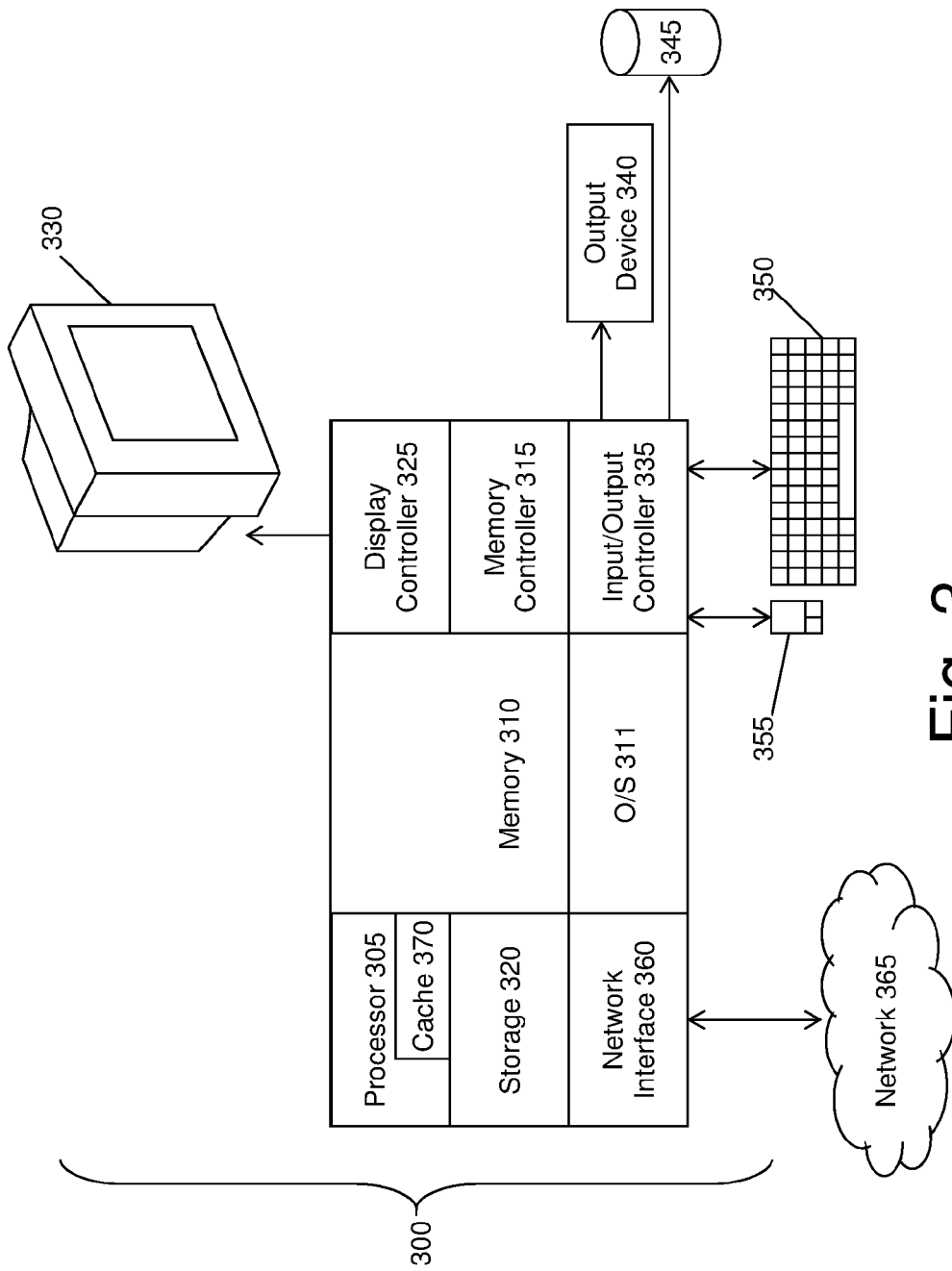

//<br>
SHARING PROGRAM INTERRUPT LOGIC IN A MULTITHREADED PROCESSOR

DOMESTIC PRIORITY

This application is a continuation of U.S. patent application Ser. No. 14/570,690, filed Dec. 15, 2014, the disclosure of which is incorporated by reference herein in its entirety.

BACKGROUND

Various embodiments of this disclosure relate to exception handling and, more particularly, to sharing program interrupt logic in a multithreaded processor.

With a microprocessor, when instructions execute and hit an exception condition, the processor retries the instruction in slow mode (i.e., a single-step mode of operation), and information about the exception condition is captured in hardware during this slow mode. In some microprocessors, the information is then consumed by a firmware layer (e.g., millicode), and the exception condition is reported to the operating system through the firmware layer.

A straight-forward implementation of multithreading requires exception tracking logic to be implemented multiple times per core, leading to power and area consumption for a piece of logic that is required only infrequently.

SUMMARY

In one embodiment of this disclosure, a computer-implemented method includes requesting, by a first processor thread of a computer processor, access to exception tracking logic. The exception tracking logic is accessible by a plurality of processor threads. The first processor thread receives access to the exception tracking logic. The first processor thread executes a process in slow mode. Based on detecting an exception in slow mode, the first processor thread stores, in the exception tracking logic, exception information about the exception. The exception information is copied from the exception tracking logic to a set of external registers outside the exception tracking logic. The exception tracking logic is released to allow access to the exception tracking logic by other processor threads of the plurality of processor threads.

In another embodiment, a system includes a memory having computer readable instructions and one or more processors for executing the computer readable instructions. The computer readable instructions include requesting, by a first processor thread, access to exception tracking logic. The exception tracking logic is accessible by a plurality of processor threads. The first processor thread receives access to the exception tracking logic. The first processor thread executes a process in slow mode. Based on detecting an exception in slow mode, the first processor thread stores, in the exception tracking logic, exception information about the exception. The exception information is copied from the exception tracking logic to a set of external registers outside the exception tracking logic. The exception tracking logic is released to allow access to the exception tracking logic by other processor threads of the plurality of processor threads.

In yet another embodiment, a computer program product for handling exceptions in a multithreaded processor includes a computer readable storage medium having program instructions embodied therewith. The program instructions are executable by the multithreaded processor to cause the multithreaded processor to perform a method. The method includes requesting, by a first processor thread, access to exception tracking logic. The exception tracking logic is accessible by a plurality of processor threads. The first processor thread receives access to the exception tracking logic. The first processor thread executes a process in slow mode. Based on detecting an exception in slow mode, the first processor thread stores, in the exception tracking logic, exception information about the exception. The exception information is copied from the exception tracking logic to a set of external registers outside the exception tracking logic. The exception tracking logic is released to allow access to the exception tracking logic by other processor threads of the plurality of processor threads.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is a block diagram of a computing device for implementing some or all aspects of the exception handling system, according to some embodiments of this disclosure.

DETAILED DESCRIPTION

Various embodiments of this disclosure are exception handling systems in multithreaded processors. The exception handling system may enable multiple threads to share a single set of resources for capturing exception information.

Figure 1:
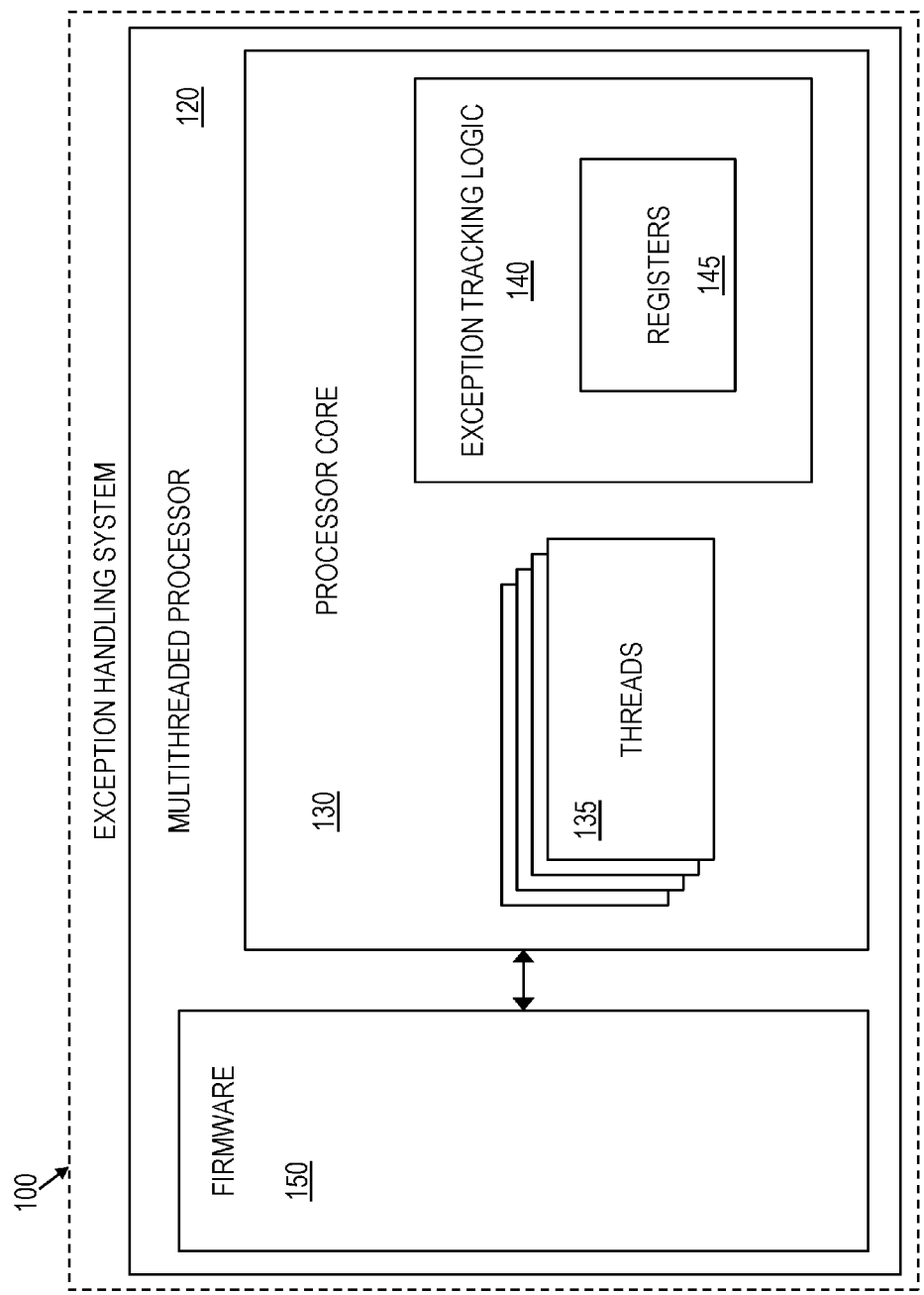
FIG. 1 is block diagram of an exception handling system for a multithreaded processor, according to some embodiments of this disclosure.

FIG. 1 is a block diagram of an exception handling system 100 for a multithreaded processor 120, according to some embodiments of this disclosure. The exception handling system 100 may be incorporated into a computing device, such as the computer system 300 shown in FIG. 3, described in more detail later in this disclosure. The computing device may include at least one multithreaded processor 120 with at least one processor core 130. The processor core 130 may include exception tracking logic 140, including exception registers 145, to be shared among the various threads 135 of the processor core 130. The exception tracking logic 140 may be hardware, software, or a combination thereof enabling the threads 135 to track and store information about exceptions. In some embodiments, the processor's firmware 150, which may be software installed on the processor 120, may manage use of the exception tracking logic 140 by the various threads 135.

Generally, the processor threads 135 may execute various processes, where each thread 135 may execute its assigned process at a given time. In some cases, a thread 135 may be unable to proceed due to an exception, such as a translation exception, for example.

With conventional exception handling, the thread 135 experiencing the exception has its own exception tracking logic 140, including exception registers 145, and the thread 135 uses its corresponding exception tracking logic 140 to handle the exception. A positive aspect of this conventional mechanism is that no thread 135 needs to wait on other threads 135 to access the exception tracking logic 140, because each thread 135 has its own exception tracking logic 140. A negative aspect of this conventional mechanism, however, is that the computing device must contain multiple copies of exception tracking logic 140. This can be a major drawback, especially given that exceptions may be rare occurrence and thus multiple copies of resources can represent a larger cost than the performance gains.

In contrast, embodiments of this disclosure may use only a single set of exception tracking logic 140 and associated registers 145. To avoid corruption of the data stored in the registers 145, only a single thread 135 may be allowed to access the exception tracking logic 140 at a time. Thus, when a first thread 135 encounters an exception, it may determine whether the exception tracking logic 140 is busy, being used by another thread 135. If the exception tracking logic 140 is busy, the first thread 135 may wait until the exception tracking logic 140 becomes available, due to having been released by the other thread 135.

In some embodiments, the exception handling system 100 may use a queue to manage the threads' access to the exception tracking logic 140. More specifically, in some embodiments, the firmware 150 may manage access to the exception tracking logic 140. The queue may be, for example, a first-in-first-out queue. When the first thread 135 requests the exception tracking logic 140, and the exception handling logic 130 is currently busy, the firmware 150 may place the first thread 135 on the queue. When the exception tracking logic 140 becomes available, the firmware 150 may grant, to the thread 135 at the front of the queue, access to the exception tracking logic 140. The exception tracking logic 140 may thus be deemed busy again. In this manner, each thread 135 requesting access to the exception tracking logic 130 may receive such access in turn.

After a thread 135 obtains access to the exception tracking logic 140, the thread 135 may enter slow mode to validate the exception in a single step mode. Before entering slow mode and, in some embodiments, before requesting the exception tracking logic 140, the thread 135 may have backtracked over one or more instructions. Thus, in slow mode, the thread 135 may repeat a set of instructions using slow mode. In some cases, the original exception may have resulted from a resource conflict or from some other temporary circumstance. Thus, validating the exception with slow mode may serve various purposes, including, for example, attempting the process again and passing along details of the exception to enable troubleshooting.

In some embodiments, the thread 135 executing in slow mode may perform only a single instruction at a time, and in some further embodiments, that thread 135 in slow mode may be the only thread 135 of the processor core 130 that is currently executing instructions. In other words, all other threads 135 of the core 130 may be paused while a thread 135 is in slow mode.

As the thread 135 executes its process in slow mode, one instruction at a time, it may once again encounter the exception that caused it to request the exception tracking logic 140 and enter slow mode. When the exception is detected again, the thread 135 may write the exception tracking logic 140 with the appropriate exception information. Specifically, the thread 135 may write this exception information to the registers 145 of the exception tracking logic 140. The exception information written may be the information needed to enable processing of the exception, and may be the same information as would be written within a conventional exception handling system. For example, and not by way of limitation, in the case of a translation exception, the thread 135 may write to the exception tracking logic 140 a translation exception address, a program interruption code, and an interruption instruction address.

After the exception tracking logic 140 is written with the exception information, the firmware 150 may read the exception information from the exception tracking logic 140 into registers outside the exception tracking logic 140, such as general purpose registers or special purpose registers. As a result, the exception information may become accessible for troubleshooting outside the exception tracking logic 140.

To end the exception handling for the current thread 135 having access to the exception tracking logic 140, the processor core 130 may leave slow mode and return to regular operation, i.e., fast mode. In other words, the various threads 135 may resume execution of their processes at full performance. Additionally, the firmware 150 may release the exception tracking logic 130 on behalf of the thread 135, thus enabling other threads 135 to gain access.

In some embodiments, in addition to or as an alternative to the above, the firmware 150 may detect an exception during normal operation. The exception tracking logic 140 need not be involved with this detection. However, if another thread 135 on the CPU 130 has detected an exception, and the exception tracking logic 140 is thus in use writing exception information into registers 145, the firmware 150 running on the current thread 135 might be unable to write its exception information into the exception registers 145. Therefore, the firmware 150 may directly write its exception information into the general purpose registers or special purpose registers outside of the exception tracking logic 140, and may set a variable (e.g., a bit) indicating that the exception information is not in the exception registers 145, but is already in the external registers. Thus, when the exception is being processed, if the variable indicates that the exception information is already in the external registers, the exception handling system 100 may bypass copying the exception information from the exception registers 145.

The firmware 150 may process the exception based on the exception information now stored in the general purpose or special purpose registers. After the exception is processed (e.g., by storing appropriate information into a prefix page and loading a program new status word), the firmware 150 may return control to the operating system or application program that encountered the exception, by returning execution to the program at the program new status word's instruction address.

In conventional exception handling, because multiple exception tracking logics 140 are used, with a single one for each thread 135, no exception tracking logic 140 is locked against access from multiple threads 135. Further, the exception information is not copied from the registers 145 in the exception tracking logic 145 to general purpose or other registers before processing the exception. Instead, in conventional mechanisms, the firmware 150 reads and modifies the exception information stored in the exception tracking logic 140 directly during exception processing.

Figure 2:
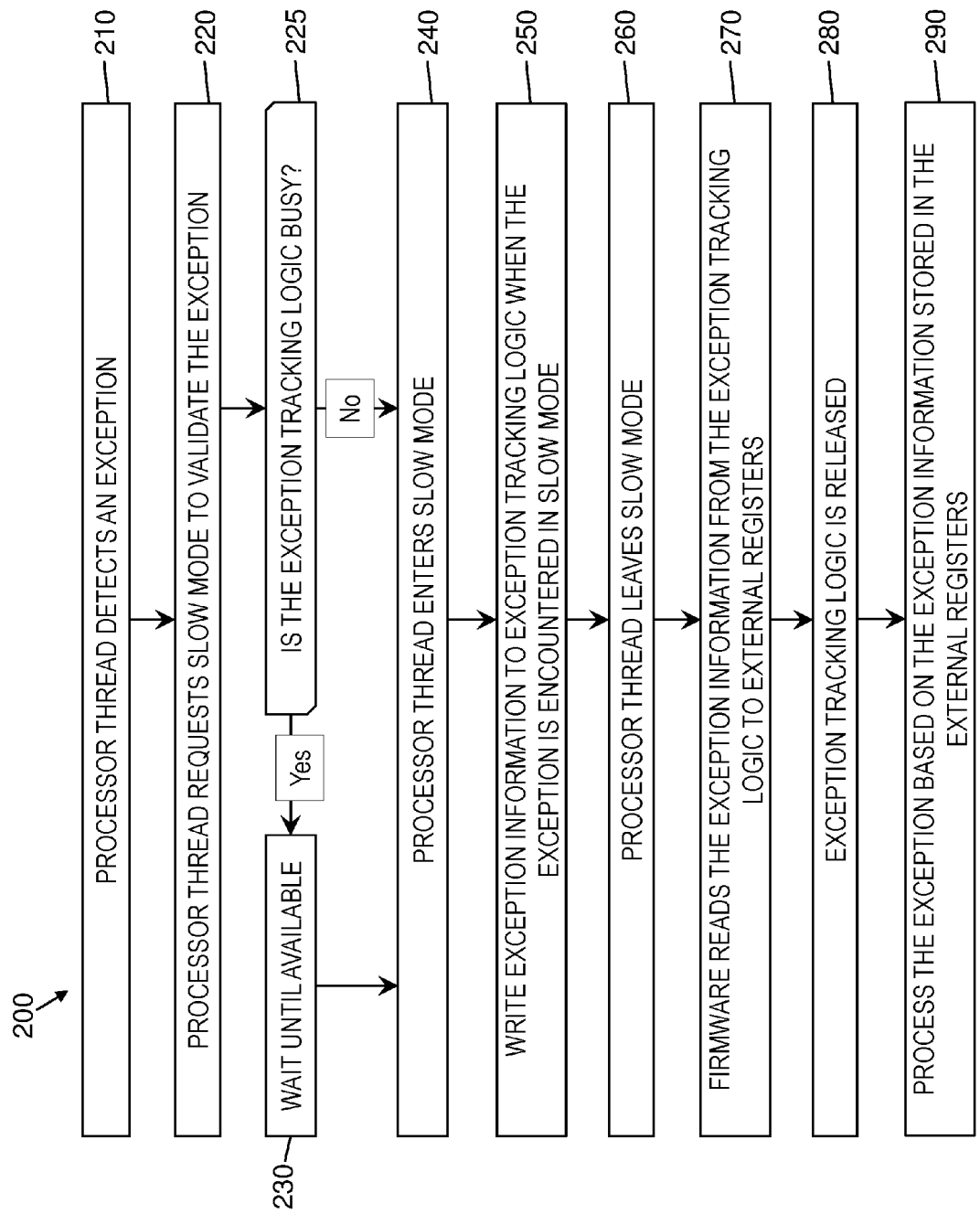
FIG. 2 is a flow diagram of a method for handling exceptions in a multithreaded processor, according to some embodiments of this disclosure.

FIG. 2 is a flow diagram of a method 200 for handling exceptions in the exception handling system 100 in a multithreaded processor 120, according to some embodiments of this disclosure. At block 210, a processor thread 135 may execute instructions and detect an exception. At block 220, the thread 135 may request slow mode to validate the exception. At decision block 225, if the exception tracking logic 140 is busy, then at block 230, the thread 135 may wait for the exception tracking logic 140 to become available. If the exception tracking logic 140 is available, then at block 240, the thread 135 may enter slow mode. At block 250, when the exception is detected again, the thread 135 may write exception information to the exception tracking logic 140. At block 260, the processor core 130 may leave slow mode and return to full performance of all threads 135. At block 270, the firmware 150 may read the exception information from the exception tracking logic 140 to general purpose registers or other registers outside the exception tracking logic 140. At block 280, the firmware 150 may release the exception tracking logic 140, to enable another thread 135 to enter slow mode with access to the exception tracking logic 140. At block 290, the firmware 150 may process the exception based on the exception information in the general purpose registers or other registers. It will be understood that other methods for handling exceptions may also be within the scope of this disclosure.

FIG. 3 illustrates a block diagram of a computer system 300 for use in implementing an exception handling system or method according to some embodiments. The exception handling systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 300, such as a personal computer, workstation, minicomputer, or mainframe computer.

In an exemplary embodiment, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. A conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310, and may be the multithreaded processor 120 described with respect to FIG. 1. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the exception handling systems and methods of this disclosure.

The computer system 300 may further include a display controller 325 coupled to a display 330. In an exemplary embodiment, the computer system 300 may further include a network interface 360 for coupling to a network 365. The network 365 may be an IP-based network for communication between the computer system 300 and any external server, client and the like via a broadband connection. The network 365 transmits and receives data between the computer system 300 and external systems. In an exemplary embodiment, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Exception handling systems and methods according to this disclosure may be embodied, in whole or in part, in computer program products or in computer systems 300, such as that illustrated in FIG. 3.

Technical effects and benefits of some embodiments of the exception handling system 100 are that multiple threads can share a single set of resources for capturing exception information, thus resulting in reduced resource usage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    requesting, by a first processor thread of a computer processor, access to exception tracking logic, the exception tracking logic being shared across a plurality of processor threads, wherein only a single processor thread of the plurality of processor threads is configured to access the exception tracking logic at a time;
    receiving, by the first processor thread, access to the exception tracking logic;
    preventing a second processor thread's access to the exception tracking logic while the first processor thread has access to the exception tracking logic;
    executing, by the first processor thread, a process in slow mode, wherein the executing the process in the slow mode comprises:
        performing, by the first processor thread, a single instruction at a time; and
        pausing other processor threads of the plurality of processor threads until the slow mode ends;
    based on detecting an exception during the slow mode, storing, by the first processor thread, exception information about the exception in the exception tracking logic;
    copying the exception information from the exception tracking logic to a set of external registers outside the exception tracking logic;
    releasing the exception tracking logic to allow access to the exception tracking logic by the other processor threads of the plurality of processor threads; and
    processing the exception, after the copying the exception information, based on the exception information stored in the set of external registers, wherein the copying the exception information and the processing the exception are performed by firmware.

* * * * *